Sept. 11, 1928.  
N. E. WOODS  
MOTOR  
Filed Nov. 5, 1923  
1,684,210  
14 Sheets-Sheet 1
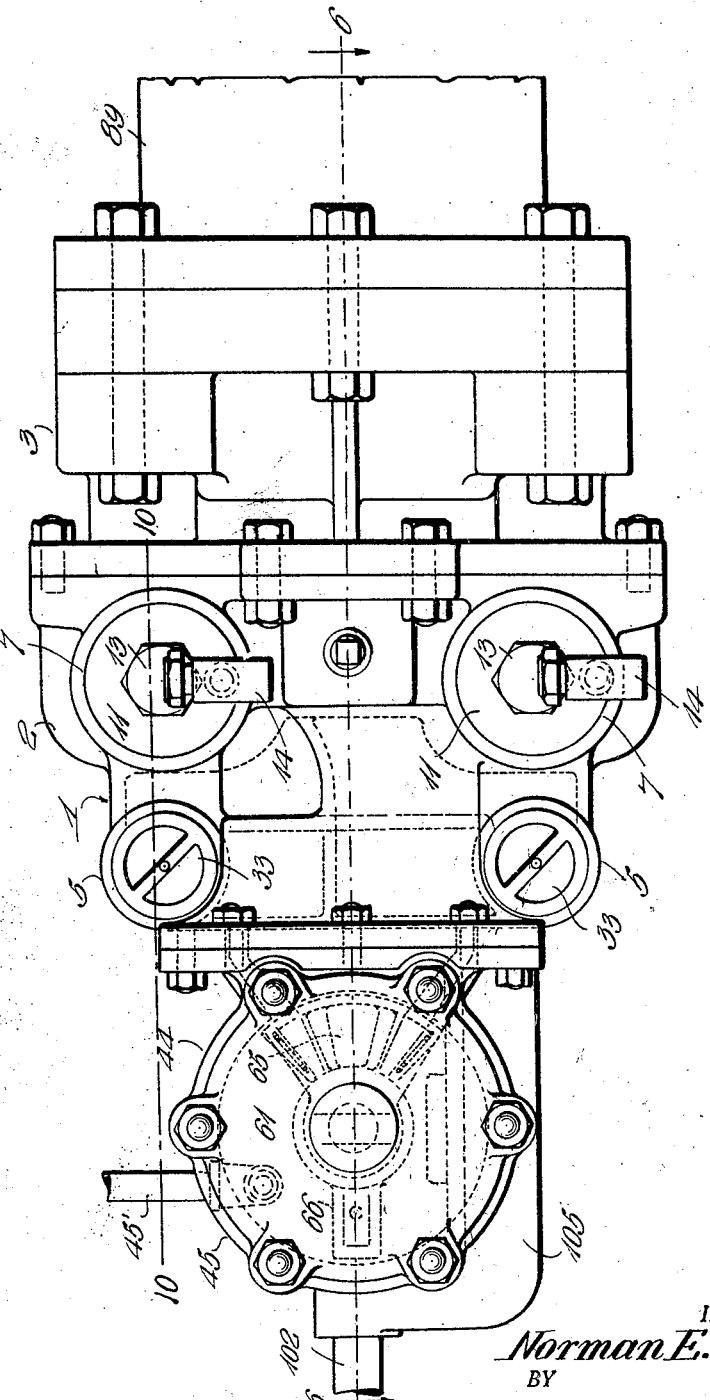
INVENTOR:  
Norman E. Woods,  
BY  
ATTORNEY.

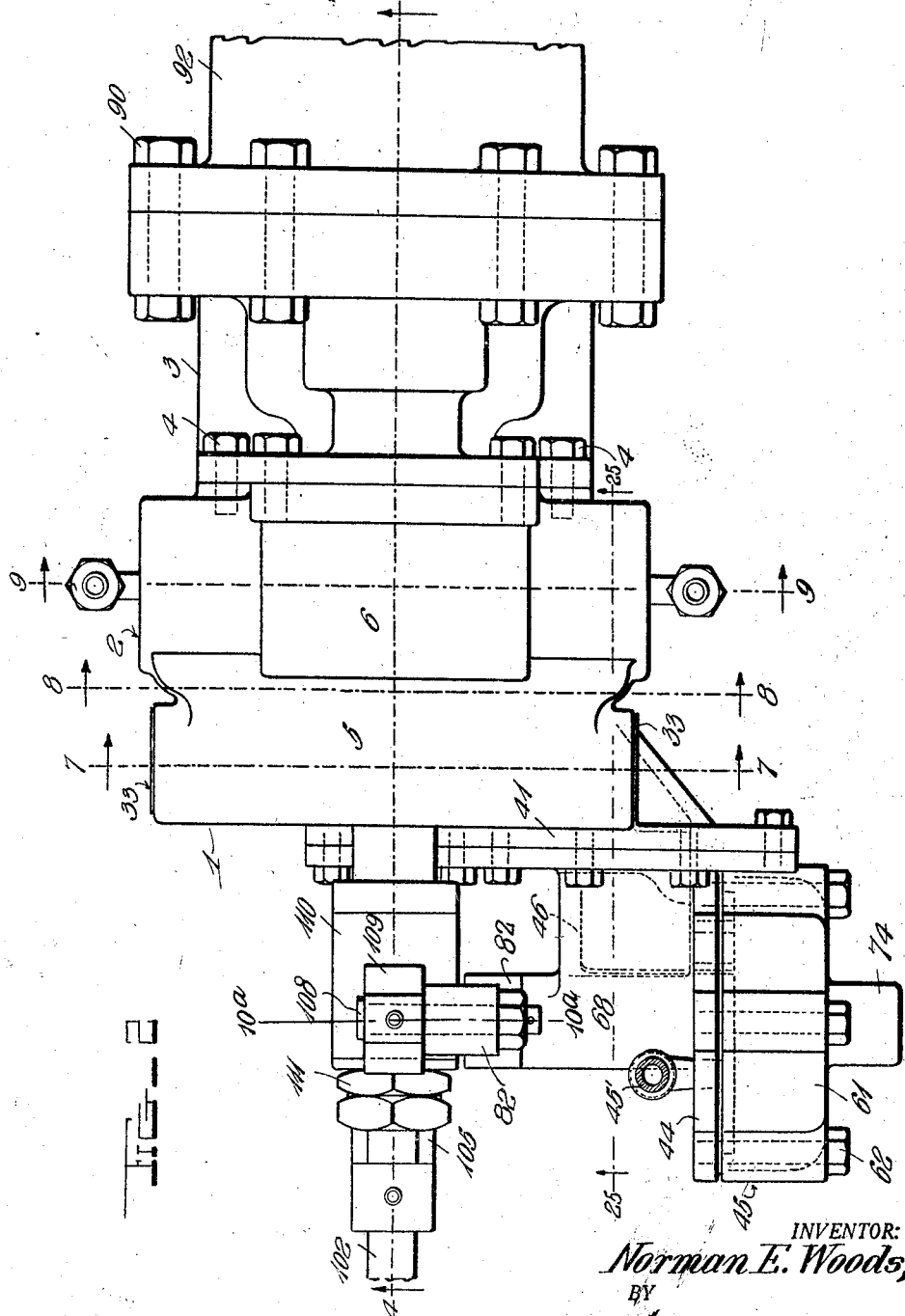

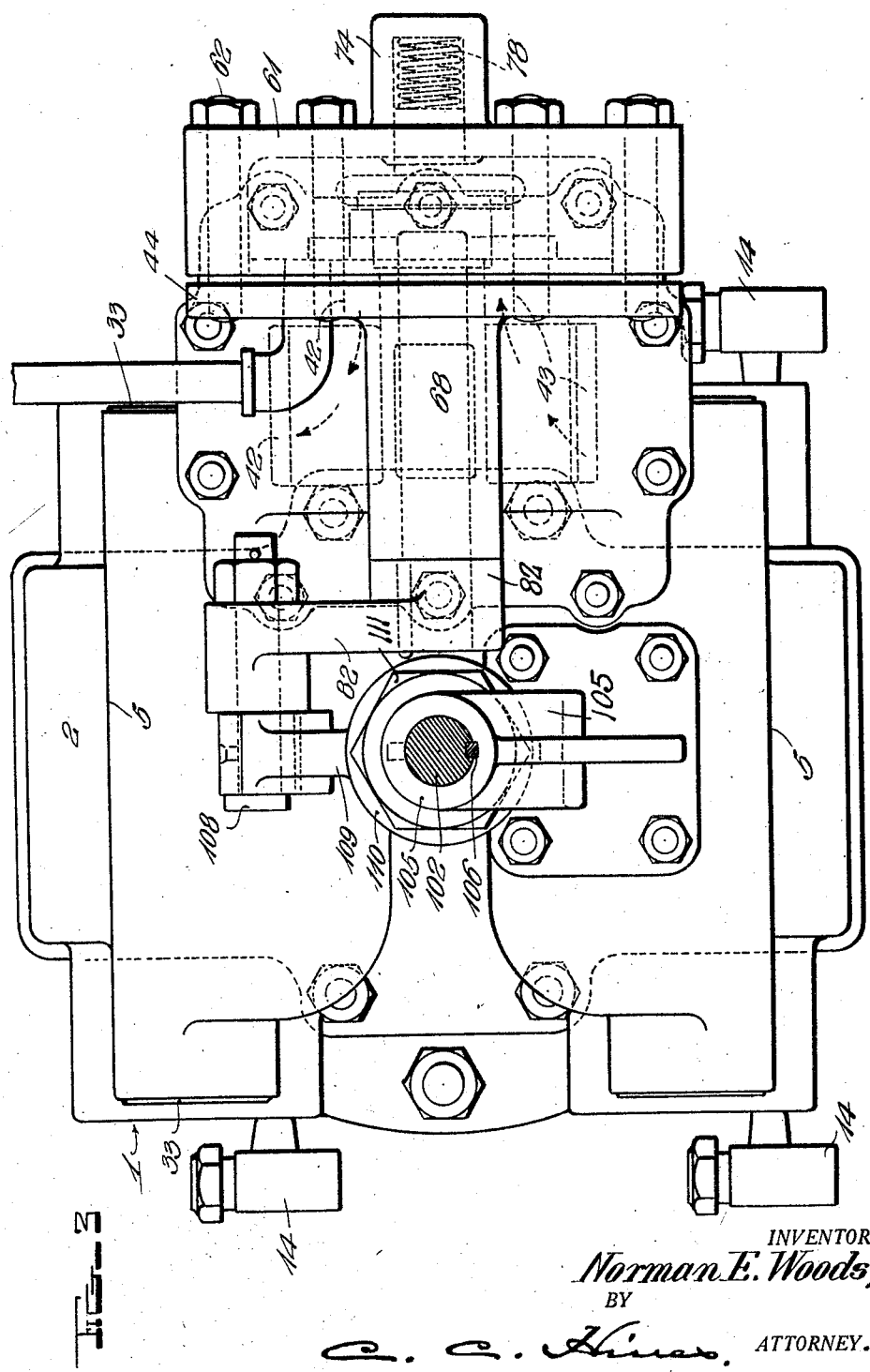

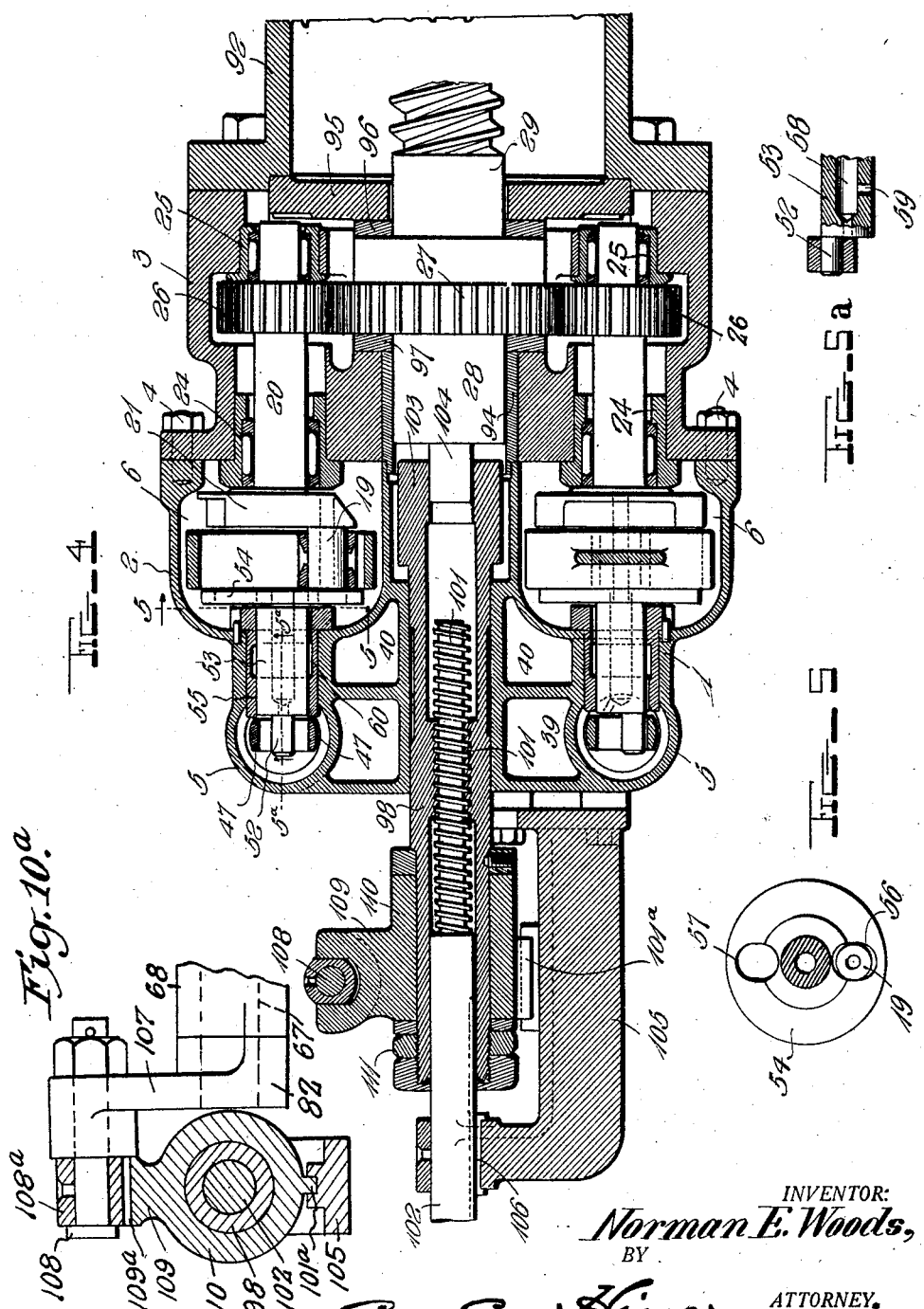

Sept. 11, 1928.
N. E. WOODS
MOTOR
Filed Nov. 5, 1923
1,684,210
14 Sheets-Sheet 5
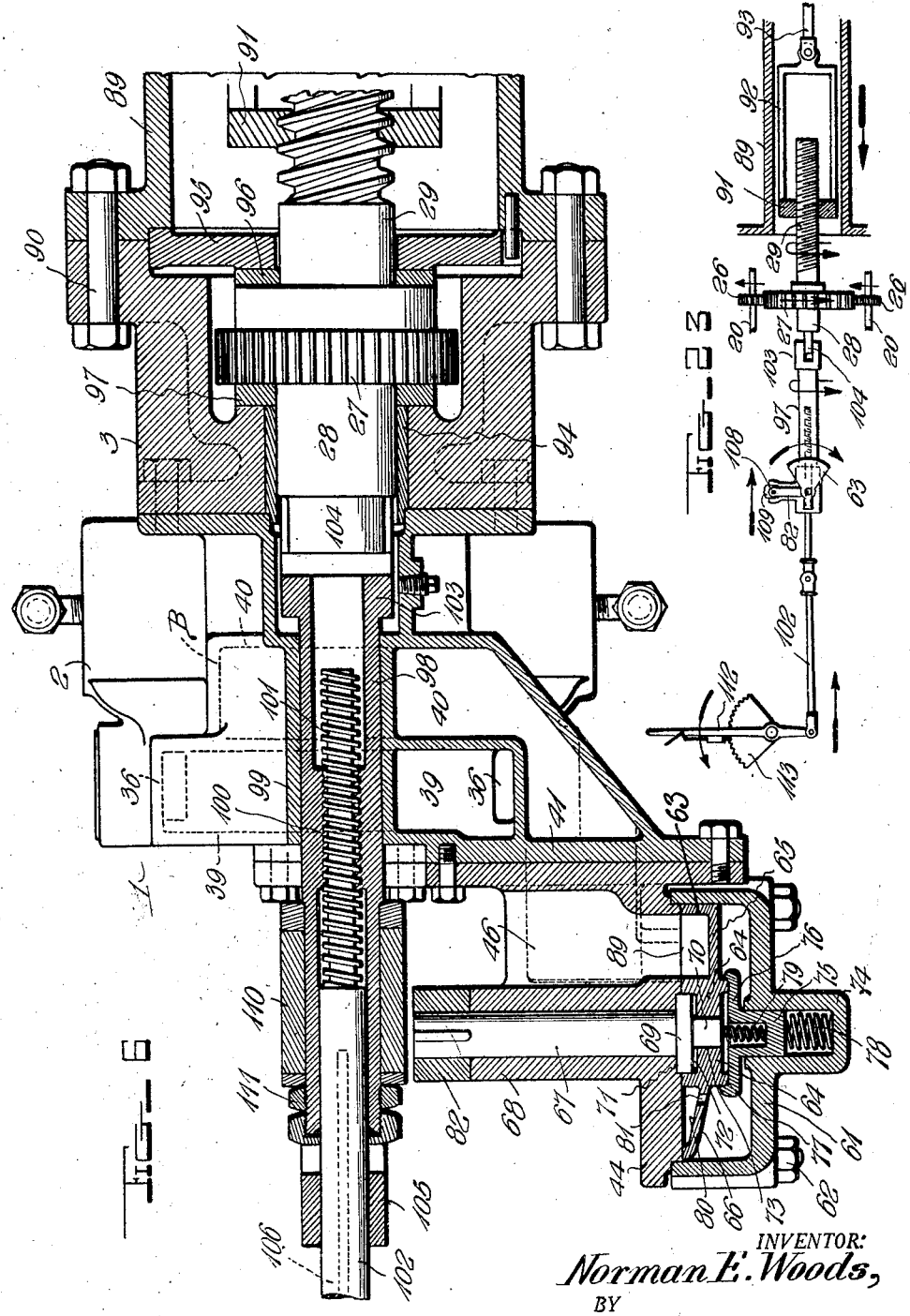
INVENTOR:
Norman E. Woods,
BY
C. C. Hines, ATTORNEY.

Sept. 11, 1928.
N. E. WOODS
MOTOR
Filed Nov. 5, 1923
1,684,210
14 Sheets-Sheet 6
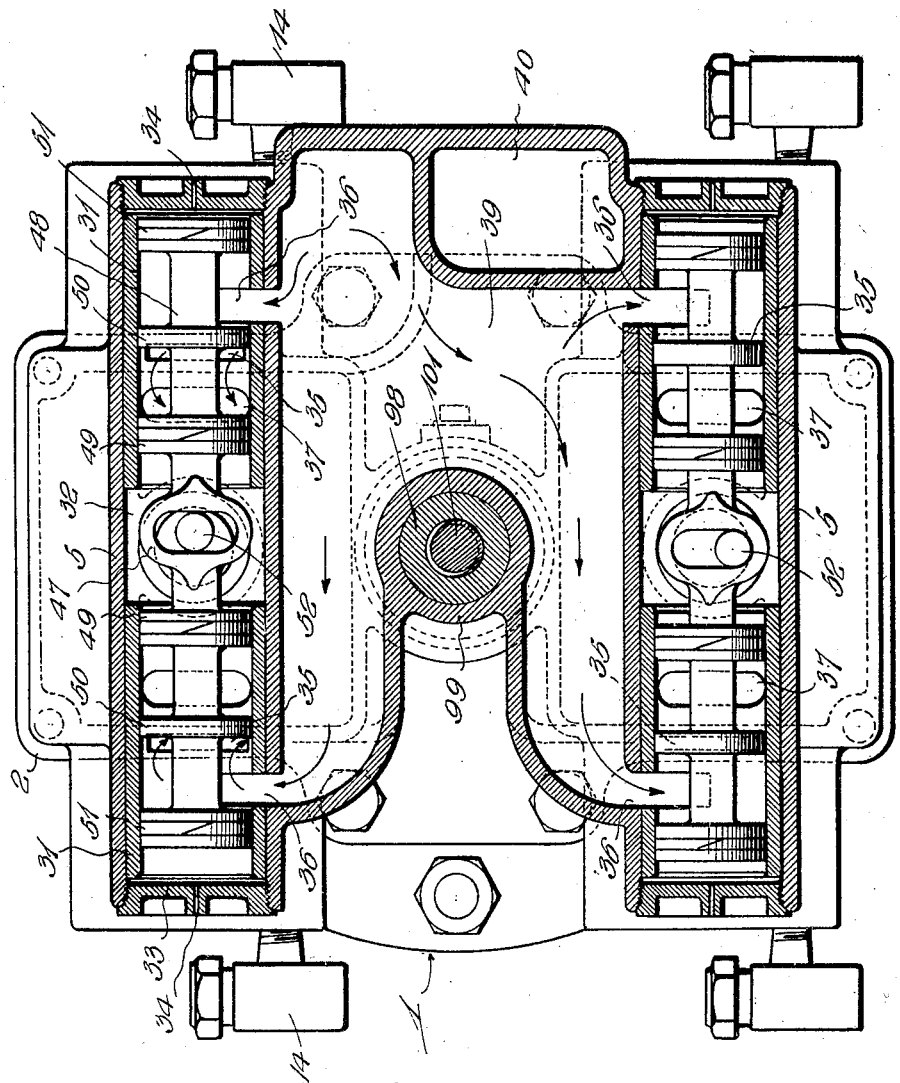
INVENTOR:
Norman E. Woods,
BY
C. A. Hines, ATTORNEY.

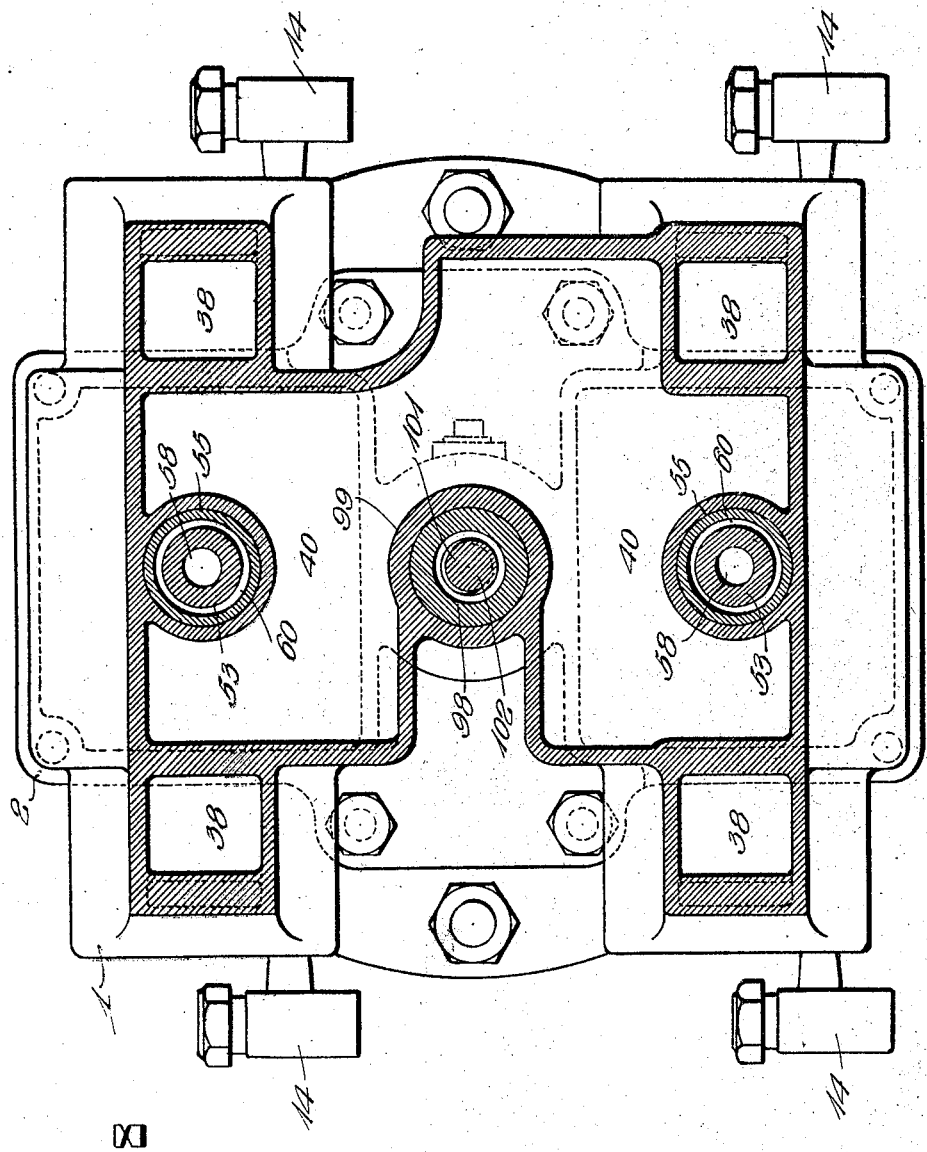

Sept. 11, 1928.
N. E. WOODS
1,684,210
MOTOR
Filed Nov. 5, 1923
14 Sheets-Sheet 8
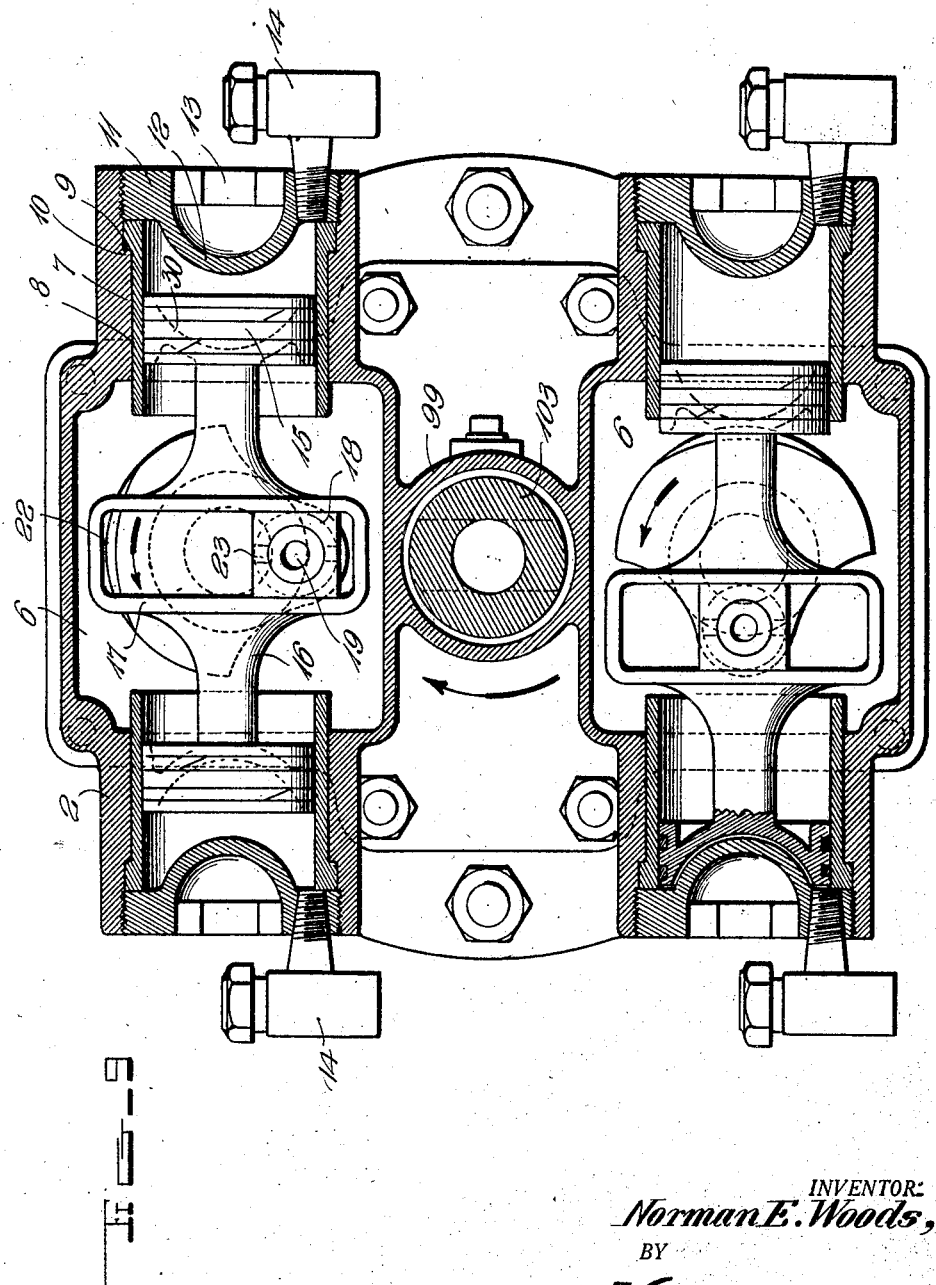
INVENTOR:
*Norman E. Woods*,
BY
*C. C. Hines*, ATTORNEY.

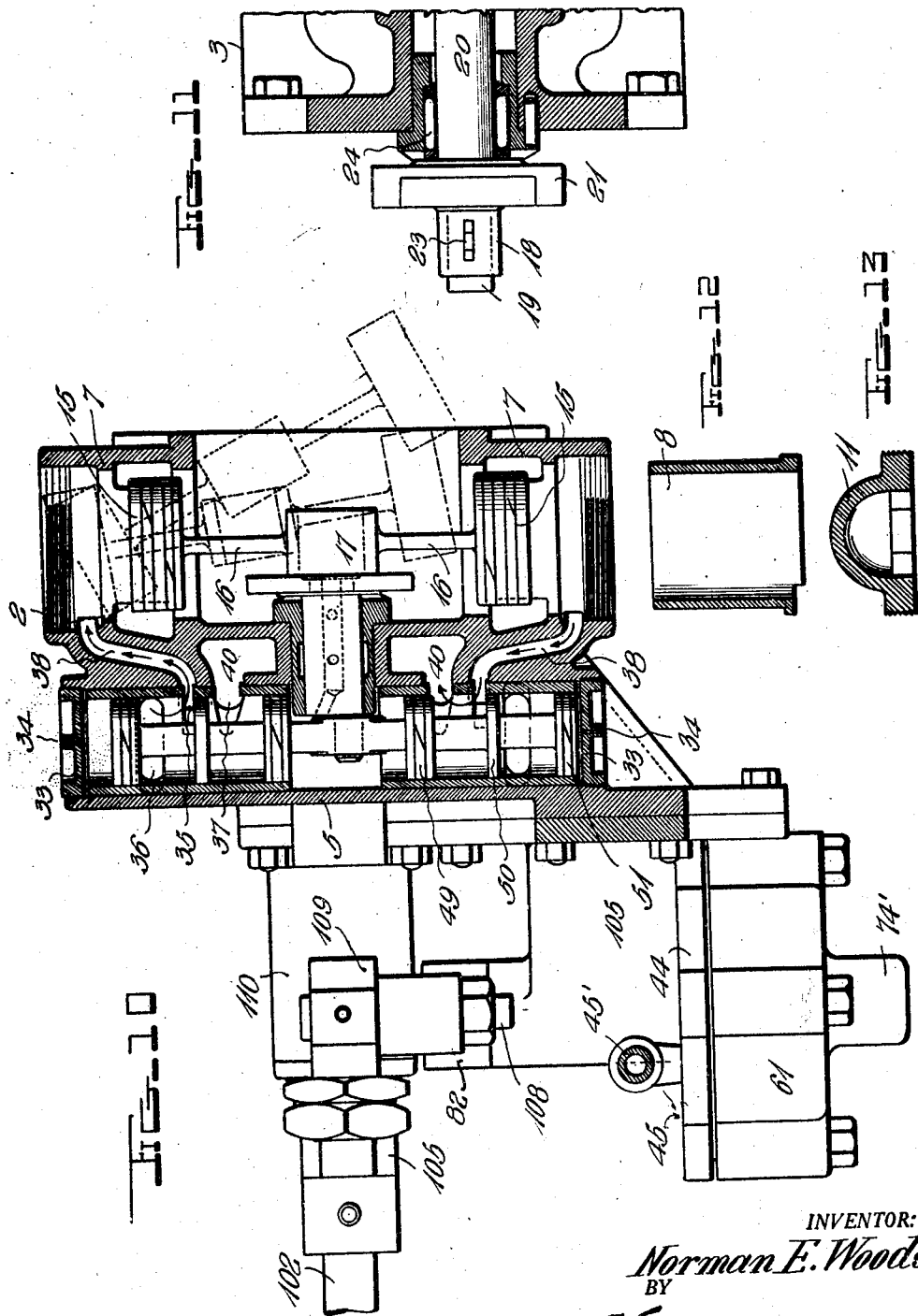

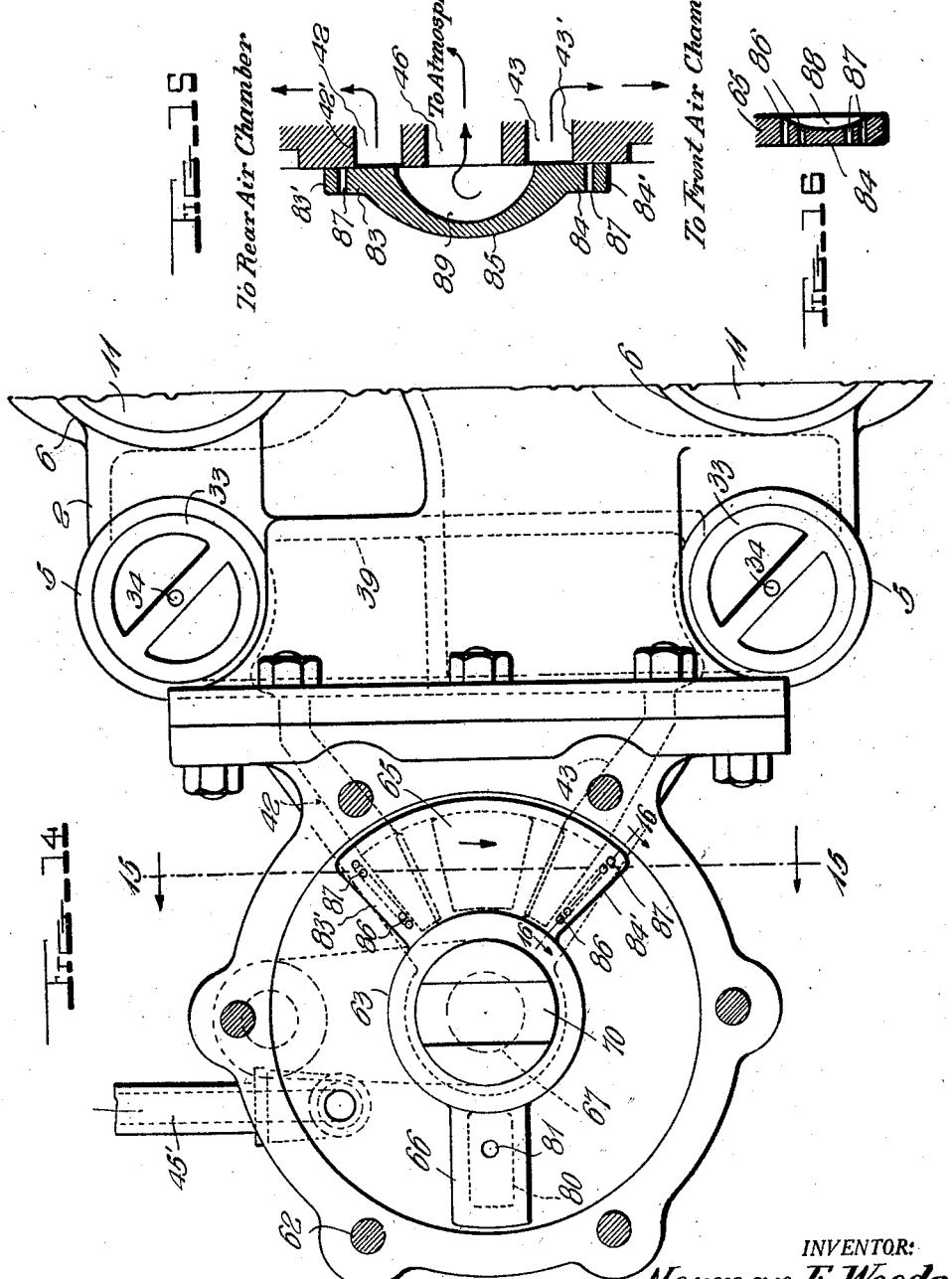

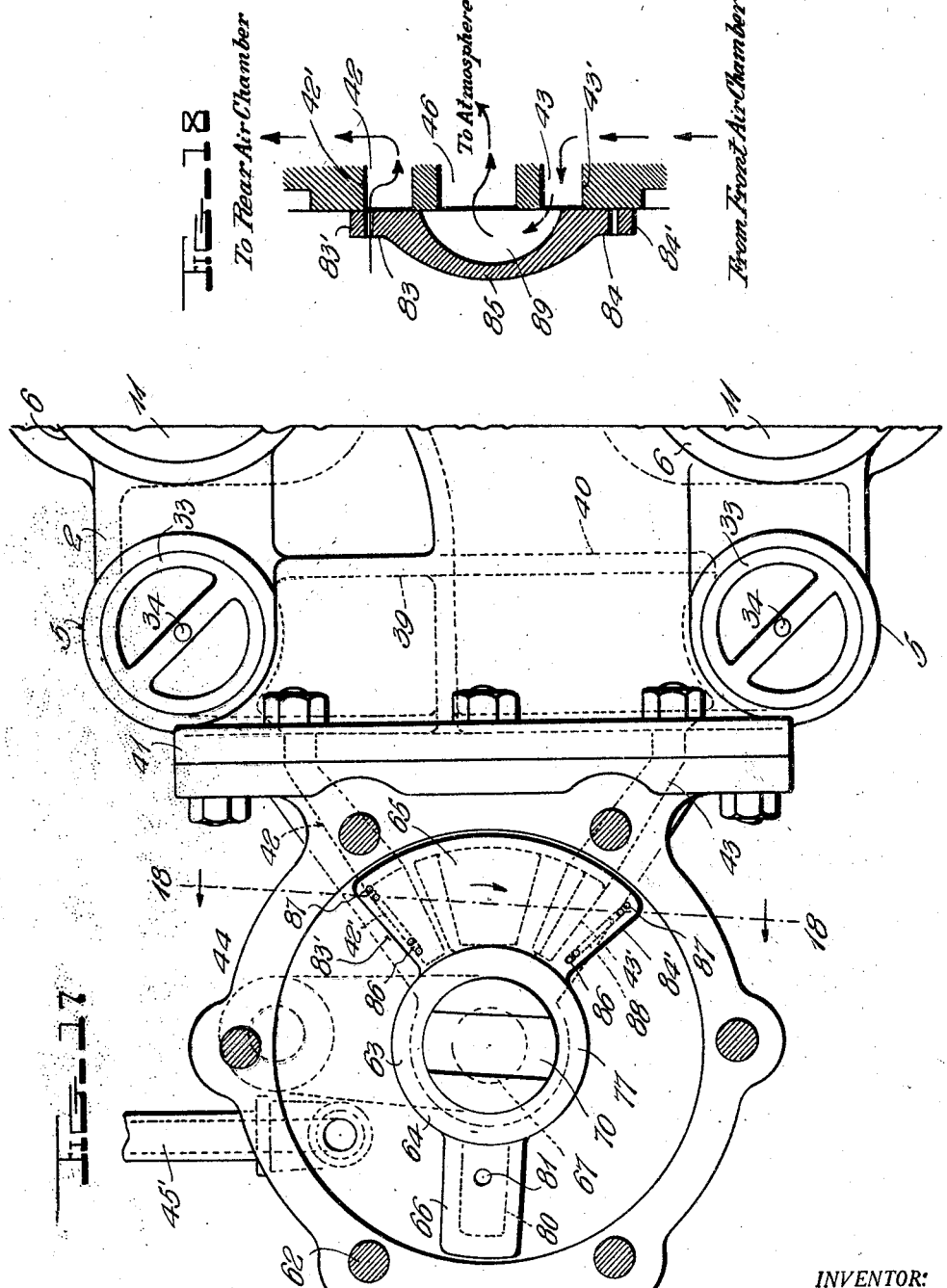

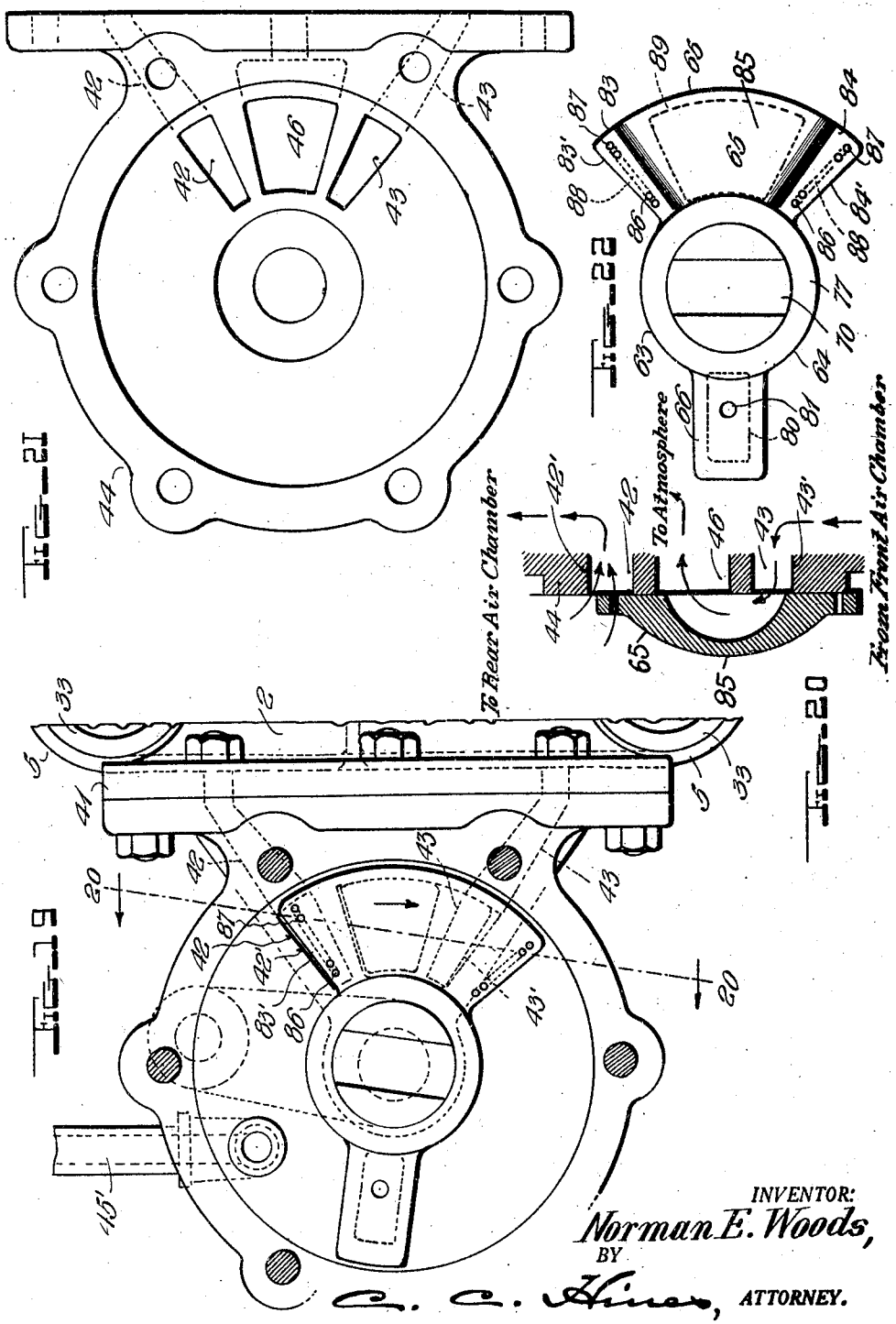

Sept. 11, 1928.  1,684,210
N. E. WOODS
MOTOR
Filed Nov. 5, 1923   14 Sheets-Sheet 13
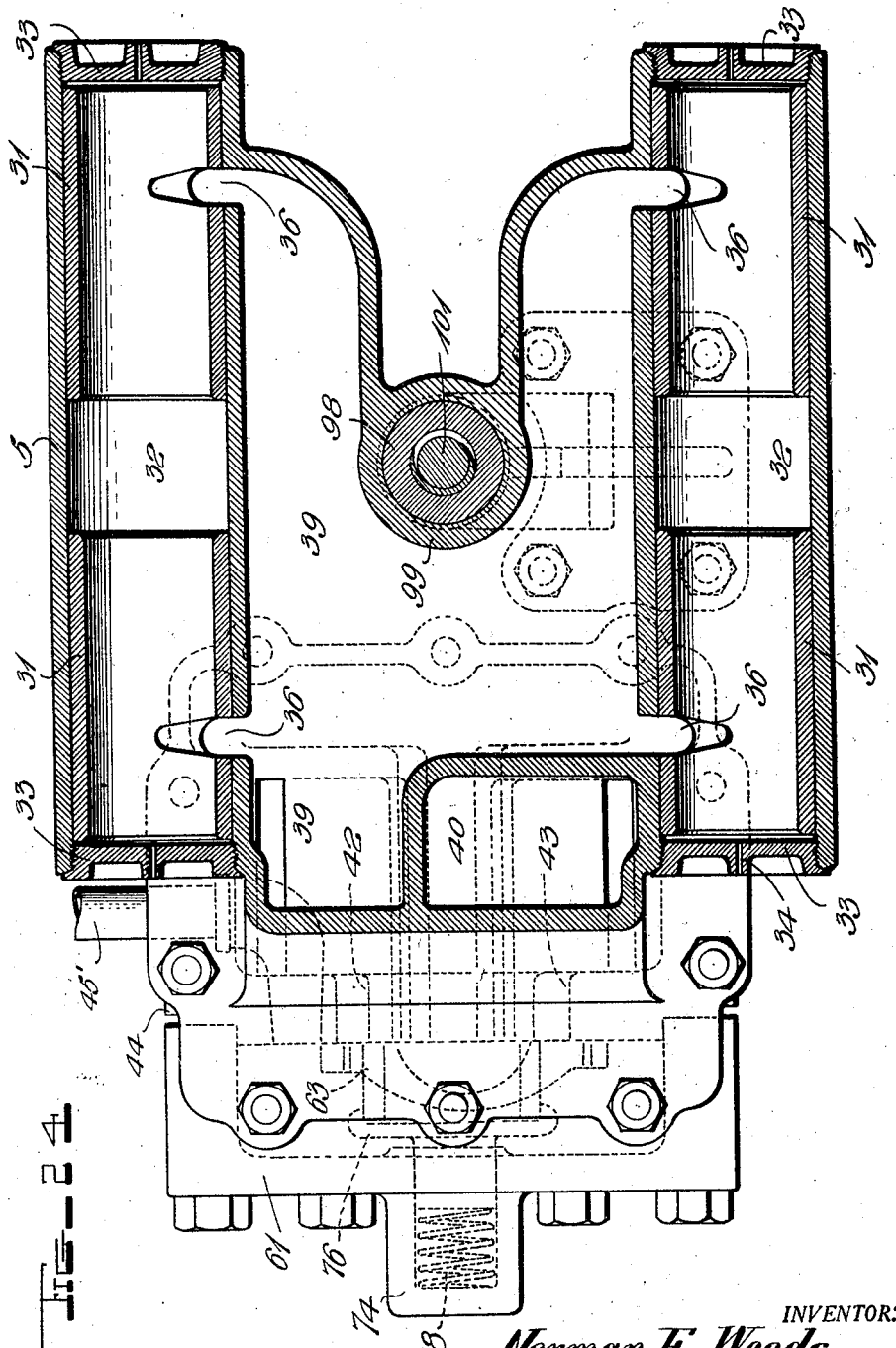
INVENTOR:
Norman E. Woods,
BY
A. A. Hines,
ATTORNEY.

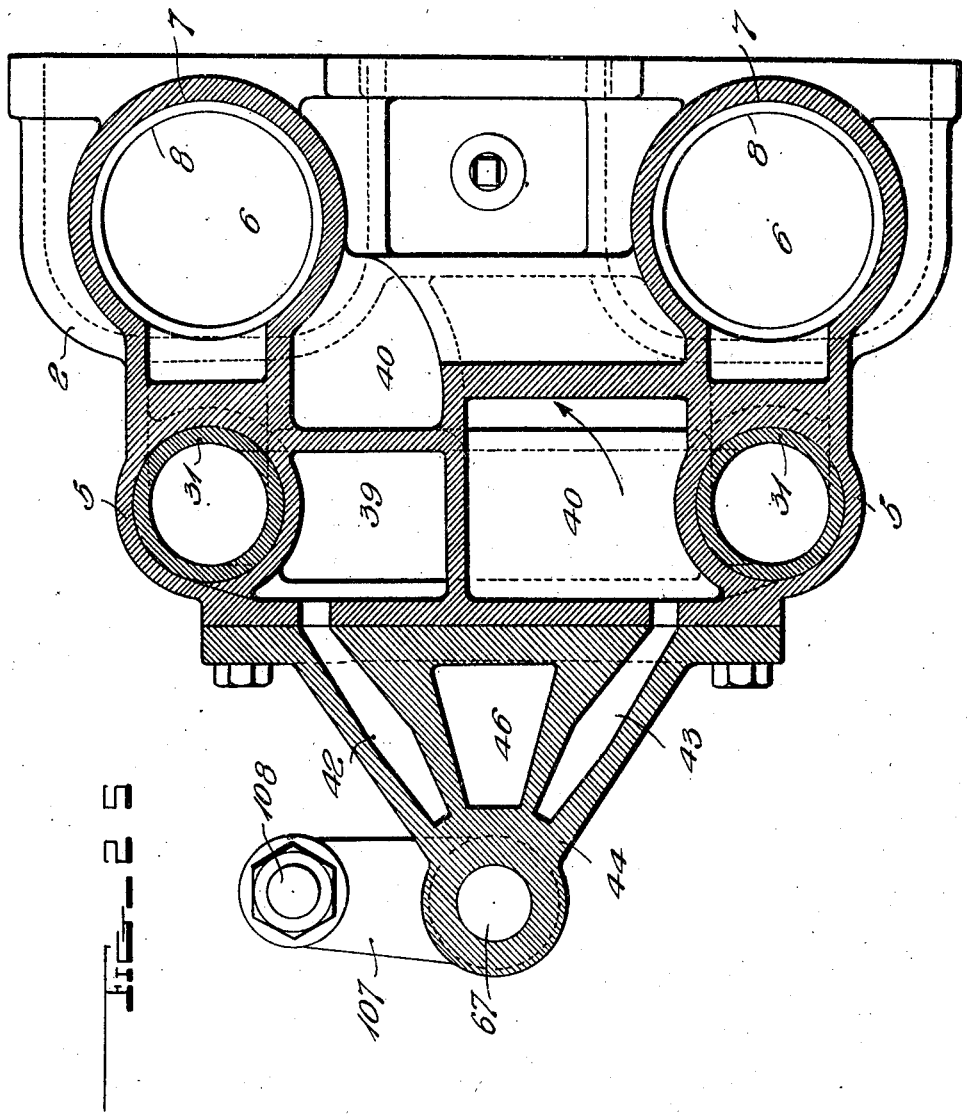

Patented Sept. 11, 1928.

1,684,210

UNITED STATES PATENT OFFICE.

NORMAN EDLOW WOODS, OF PATERSON, NEW JERSEY; LEILA P. WOODS ADMINISTRATRIX OF SAID NORMAN EDLOW WOODS, DECEASED.

MOTOR.

Application filed November 5, 1923. Serial No. 672,905.

This invention relates to motors, and particularly to motors of the stationary class and of that type driven by compressed air, steam or other motive fluid and employing reciprocating pistons, together with associated motion translating and transmitting means, for communicating driving motion from the reciprocating pistons to a rotary spindle or shaft.

One object of my invention is to provide a novel construction and relative disposition of working parts, in a motor of the character described, whereby smoothness of action is ensured and whereby regular and uniform driving power will be transmitted from the pistons to the rotary shaft to be driven.

Another object of the invention is to provide a reversible motor whereby the driven rotary shaft may be rotated in either direction at will, said motor including a throttle valve and cooperating controlling means, governed by the motion of the driven rotary shaft on either of its directions of motion, whereby the operation of the motor will be automatically stopped when the shaft has made a predetermined number of revolutions.

Another object of the invention is to provide a motor the parts of which are so constructed and mounted as to permit of their ready and convenient assemblage for setting up the motor and disassemblage for taking down the motor in whole or in part for cleaning, repairs, replacements or other purposes; and which further embodies means for ensuring effective lubrication of all working parts and bearing surfaces.

Another object of the invention is to provide a motor which, while efficient for general use, is especially adapted as a power element for operating the actuating shaft or element of locomotive reverse gears, stokers, and other similar mechanical devices or appliances.

Another object of the invention is to provide a motor having throttle valve mechanism operative for the supply of fluid pressure to drive the motor smoothly and easily at either low or high speed, and which is adapted for a positive cut-off action and exhaust of any retained fluid pressure, at the time of cut-off, to prevent creeping of the mechanism driven by the motor or any excessive motion of said mechanism on the subsequent admission of fluid pressure to the motor on the next working action.

Another object of the invention is to provide a simple and compact type of motor within which is received and enclosed the power receiving end of the driven shaft and the associated elements of the means for controlling the throttle valve, so as to protect such parts from the access of dirt and grit, while eliminating end and side thrust on the working parts commonly subjected thereto, and at the same time transmitting direct straight power from the engine to the shaft.

In the present disclosure the motor is shown and described as arranged for working action in a horizontal position, and as employed for use as a power element for operating a known type of locomotive reverse gear, using compressed air as the motive fluid, although it is to be understood that the motor is not restricted to such working position, or service use, or to the use of air as the motive fluid.

In the accompanying drawings, showing one operative embodiment of the invention,—

Figure 1 is a view in side elevation of a motor embodying my invention, and the housing cylinder of a locomotive reverse gear to which it is applied, a portion of which cylinder is shown.

Figure 2 is a top plan view of the motor and cylinder as shown in Figure 1.

Figure 3 is a rear end elevation of the motor.

Figure 4 is a central vertical longitudinal section taken on line 4—4 of Figure 2.

Figure 5 is a detail section on line 5—5 of Figure 4.

Figure 5ª is a detail section on line 5ª—5ª of Figure 4 through the crank pin stem of one of the piston valve-actuating crank heads.

Figure 6 is a horizontal section taken on line 6—6 of Figure 1.

Figures 7, 8 and 9 are vertical transverse sections taken, respectively on lines 7—7, 8—8 and 9—9 of Figure 2.

Figure 10 is a horizontal section through the piston chamber section of the motor casing, taken substantially on line 10—10 of Figure 1, showing in dotted lines the mode of applying or removing a piston unit.

Figure 10ᵃ is a section taken substantially on line 10ᵃ—10ᵃ of Figure 2.

Figure 11 is a section, corresponding to that of Figure 10, through the gear chamber section of the motor casing, detached from the piston chamber section of the casing.

Figure 12 is a sectional view through one of the piston cylinders.

Figure 13 is a similar view of one of the detachable cylinder heads.

Figure 14 is a side elevation of the rear portion of the motor, showing the cover of the throttle valve casing removed, the valve appearing in elevation and in normal or feed cut off position.

Figure 15 is a section on line 15—15 of Figure 14.

Figure 16 is a detail section on line 16—16 of Figure 14.

Figure 17 is a view similar to Figure 14 showing the valve shifted on its preliminary traverse in one direction for admitting motive fluid to the cylinders for low speed motion of the motor in one direction.

Figure 18 is a section on line 18—18 of Figure 17.

Figure 19 is a view similar to Figures 14 and 17, showing the valve shifted on its final traverse in the same direction for admitting fluid pressure to drive the motor at high speed.

Figure 20 is a section on line 20—20 of Figure 19.

Figure 21 is a face view of the valve casing body with parts removed therefrom.

Figure 22 is an outer side elevation of the valve per se.

Figure 23 is a diagrammatic elevation illustrating the application of the motor for operating the motion actuating element of a controlling mechanism, such as a locomotive reverse gear.

Figure 24 is a view similar to Figure 7 but looking in the opposite direction or toward the rear of the motor.

Figure 25 is a section taken substantially on line 25—25 of Figure 2.

The motor comprises a casing or housing, generally indicated at 1, which is preferably divided on a vertical transverse line into sections 2 and 3; the section 2 forming an enclosure for the actuating pistons and their controlling valves, and the section 3 an enclosure for the power transmitting gearing driven by the motion of the pistons. The opposed faces of these sections 2 and 3 abut and are united by bolts or screws 4, whereby said casing sections are detachably coupled.

Formed in, and as part of, the casing section 2 are two superposed horizontal transverse feed and exhaust valve chambers 5, and two superposed horizontal transverse crank and cross head chambers 6. Each valve chamber 5 is of circular form in cross-section and extends from side to side of the casing section 2, while each crank and cross head chamber 6 is preferably of rectangular form and disposed centrally of the casing section 2 between alined circular openings 7, such openings 7 extending from the sides of the chamber 6 outwardly through opposite sides of said casing section 2. The upper and lower valve and crank and cross head chambers are disposed in working pairs above and below the horizontal transverse center of the motor, and each crank and cross head chamber 6 is located in advance of its coacting valve chamber 5 and is closed on its side adjacent to the valve casing and normally open at its opposite side, the open sides of the crank chambers being closed by the casing section 3.

Fitted in the openings 7, alining with each chamber 6, are detachable cylinders 8, having at their outer ends shoulders 9 engaging shoulders 10 formed on the casing section 2 and held in position by detachable heads 11, threaded into said openings and whereby the shouldered portions 9 of the cylinders are clamped against the shoulders 10. The cylinders 8 are open at their inner ends, which project slightly into the chamber 6, so as to receive lubricant therefrom, and are adapted to be slidably withdrawn upon removal of the heads 11. Each head 11 is provided with an inwardly extending hemispherical boss 12, forming a socket having a surface 13 of angular form to receive a suitable wrench, whereby the cylinder head may be readily and conveniently applied or removed. The heads 11 may carry automatic cylinder cocks 14 for the discharge of any water of condensation in the cylinders when steam is used as the motive fluid.

Pistons 15 are fitted for reciprocatory movements in the cylinders 8, and the pair of pistons fitted in the cylinders opening into each crank chamber 6 are rigidly coupled for movement in unison by a rod 16 integral with the pistons and with a cross head yoke 17. The yoke 17 is disposed in the chamber 6, and is of oblong rectangular form or slotted to provide a guideway of such form for a cross head slide block 18, movable in said guideway, on a line at right angles to the line of motion of the pistons. Each slide block 18 is provided with a bearing opening receiving a wrist pin 19, on the inner end of a transmission shaft 20, which shaft is also provided with a suitable form of counterbalance 21, to ensure an even and regulated continuity of motion thereof. The counterbalance shown is in the form of a segment, the central portion of the periphery of which lies at a somewhat greater radial distance from the shaft 20 than the distance between said shaft and the inner ends of the cylinders 8, and, in order to adapt such counterbalance to clear the inner ends of the cylinders on its working motion, the central portion of the counterbalance is suitably cut away, as indicated at 22. Lubricant inlet openings 23 are formed in the sides of the block 18, facing the ends of the cross head yoke, so that, on each reciprocatory motion of the slide, lubricant will be forced through the openings to freely lubricate the engaging surfaces of the block 18 and pin 19. The chamber 6, in addition to containing the working parts mentioned, and associated parts coupling the shaft 20 to the intake and exhaust valve located in rear of chamber 6, as hereinafter described, serves also in practice as a receptacle for grease or other lubricant, whereby thorough an effective lubrication of the parts will be obtained. It will be observed from the foregoing that sets of pistons 15, arranged in tandem at opposite sides of the center of the motor, are provided for driving a pair of transmission shafts 20, similarly located at opposite sides of the center of the motor, through the medium of the cross head yokes, cross head blocks and wrist pins described, whereby the two shafts 20 will be simultaneously actuated. The shafts 20 are journaled at their outer or forward ends in spaced bearings 24 and 25 mounted in casing section 3. Fixed on each shaft 20, between its bearings 24 and 25, is a gear pinion 26 meshing with a gear pinion 27 on the head portion 28 of the shaft 29 to which driving motion is to be given. The wrist pins 19, of the respective sets of pistons, are arranged so that one has a 90° lead over the other, and the sets of tandem pistons, in the operation of the motor, are simultaneously driven in opposite directions, thus overcoming dead centers and ensuring positive transmission of power from the working pistons to the transmission shafts 20 and driven shaft 29 at all times in the cycle of operation. Each piston 15 is formed in its outer surface with a hemispherical cavity 30, conforming to the contour of the boss 12 of the head 11, and adapted to receive the same on the limit of outward motion of the piston, thus permitting the boss 12 and wrench receiving socket 13 to be formed while allowing each piston to move clear up to its piston head without sacrifice of motive fluid receiving space in the cylinder.

Each valve chamber 5 has disposed therein a pair of bushings 31 spaced at their inner ends to form a central compartment 32, and the ends of said chamber 5 are normally closed by removable heads 33 threaded thereinto, each head having a vent aperture 34. Each of these bushings, and the registering portions of the walls of the chamber 5, are cut away or slotted to provide ports 35, 36 and 37, such ports being thus arranged in duplicate on each side of the center of the chamber. Each port 35 and 36 is adapted to serve as a combined intake and exhaust port, according to the direction of motion of the motor. The ports 35, as particularly shown in Figure 10, connect with passages 38 leading to the outer ends of the associated cylinders 8, for the supply of motive fluid to and its exhaust from said cylinders. The ports 36 and 37 communicate, respectively, with manifold chambers 39 and 40, common to similar ports of both valve casings, and which are formed in the body of the casing section 2. These manifold chambers 39 and 40 serve interchangeably as intake and exhaust manifolds in the operation of the motor in reverse directions. The chambers 39 and 40 communicate, through ports formed in the rear wall 41 of casing section 2, with combined intake and exhaust passages 42 and 43 formed in the casing body 44 of a throttle valve device 45, mounted upon the rear portion of the motor casing, which throttle valve casing body 44 has connected therewith a motive fluid supply pipe 45' and is also provided with an exhaust outlet 46 leading to the atmosphere and disposed between said passages 42 and 43.

The duplex controlling valve, disposed in each valve chamber 5, is of the reciprocatory type and comprises a central yoke 47, and duplex valve members on opposite sides thereof, movable in the respective bushings, each of said valve members consisting of a stem 48 carrying a series of three spaced disks 49, 50 and 51. The yoke 47 is slotted to receive a crank or wrist pin 52 carried by a stem 53 extending from a crank head 54, said stem 53 being journaled for rotation in a bearing bushing 55 disposed between the chambers 5 and 6, and said head 54 being arranged between the forward end of said bushing and the adjacent face of the cross head yoke 17. The head 54 is provided on one side of its center with an oblong opening 56 to receive the projecting end of the crank pin 19, whereby it is coupled to the shaft 20 to transmit motion through the pin 52 and yoke 47 to the reciprocating valve, to shift said valve in opposite directions for controlling the valve ports at proper time periods in the rotation of shaft 20. The head 54 may be provided with an opening 57, lying diametrically opposite the opening 56, to properly distribute its weight and balance it with relation to the crank pin 19 and counterbalance 21. A passage 58, formed in the stem 53 and leading down through the head 54 intersects a lateral port 59 leading from the bearing opening of bushing 55, whereby a sufficient supply of lubricant may pass between the chambers 5 and 6 and to a lubricant receiving recess 60 in the bushing 55, for distribution to the working parts mentioned in order to properly lubricate the same. The crank pins 52 which transmit motion to the respective reciprocating piston controlling valves, may be, as shown, arranged so that one will have a 90° lead over the other, so that the motions of the valves may be properly timed for the supply and exhaust of the motive fluid, to and from the respective valve chambers and working cylinders, to simultaneously supply working fluid to opposite cylinders of each tandem pair and to exhaust the fluid from the other cylinders. By this means when one set of pistons are working in one direction, the other set of pistons will be working in the opposite direction, securing a regular and uniform application of power at all times to the transmitting shafts 20 when the engine is working.

Figure 7 shows the reciprocating valve controlling the flow of fluid to and from the upper set of cylinders shifted fully in the direction toward the right hand end of its chamber 5, in which position the valve member at the left hand end of said valve opens communication between the manifold 39, through ports 36 and 35 and the associated passage 38, to permit fluid pressure from said manifold to pass to the left hand cylinder of the upper pair of pistons, whereby such pistons will be moved to the right in chamber 5, while at the same time the valve device at the right hand end of the upper valve closes communication between the right hand upper cylinder and opens communication between said cylinders, through the associated passage 38 and ports 35 and 37, for the exhaust of fluid pressure from said cylinder to the manifold 40, and its discharge through the exhaust passage 46. Figure 7 also shows the lower reciprocatory valve device in a mid position, in which it momentarily closes communication between the associated cylinders and the manifolds 39 and 40, but is about to be shifted fully to the right hand end of its chamber 5, so as to occupy such a position as that shown by the valve in Figure 10, in which, at the moment of cut off of the upper valve device, the lower valve will establish communication between chamber 39 and the right hand lower cylinder, through ports 36 and 35 and the associated passage 38, for the supply of fluid pressure to said cylinder, to drive the lower set of pistons to the right, the shifting of said lower reciprocatory valve in such direction simultaneously establishing communication between the lower left hand cylinder and the manifold 40, for the exhaust of the spent fluid pressure formerly supplied thereto, through the discharge passage 38 and ports 35 and 37. Thus it will be understood that, through the motions of the crank pins 52, at proper intervals, the reciprocatory valves will be properly operated to control the flow of motive fluid to and from the respective manifolds and the ends of the cylinders of the upper and lower tandem pairs of pistons for giving proper working impulses to the pairs of pistons in opposite directions simultaneously, with a proper dwell in the action of the fluid controlling means to prevent loss of motive fluid from the supply manifold through any cylinder to the exhaust manifold, the operation, however, being so timed that a positive power impulse is transmitted to each transmission shaft 20 at all times in the working motion of the engine, a smooth, regular and uniform action being thereby obtained. When the manifolds 39 and 40 are respectively employed as intake and exhaust manifolds, and the ports 35 and 36 are employed as supply ports and the port 37 as an exhaust port, the motive fluid will be supplied to the motor cylinders to drive the motor in one direction. By reversing this operation, so as to employ the manifold 40 as the intake manifold, the manifold 39 as the exhaust manifold, the ports 35 and 37 as intake ports and the port 36 as the exhaust port, which may be accomplished by proper adjustment of the throttle valve device 45, as hereinafter described, the motive fluid may be supplied to the motor cylinders in a proper manner to reverse the engine or drive it in the opposite direction to that previously described. The vent openings 34 in the valve chamber heads 33 are provided to permit air from the exterior to enter and exhaust between the heads and the end piston disks 51, in order to prevent any air cushioning or suction actions liable to interfere with the proper movement of the valve device.

The throttle valve device comprises, in addition to the casing body member 44, a complementary casing forming member or cap 61, detachably secured to the body member 44 by bolts or screws 62. In the casing formed by said members 44 and 61 is an oscillatory throttle valve 63, consisting of a hub 64 provided at one side with a segmental valve plate or disk 65 and at its diametrically opposite side with a balancing tail piece 66. The valve is formed to fit snugly against the face of the body 44 provided with the ports 42, 43 and 46, and the disk 65 is adapted to overlie and cover said ports in the normally closed position of the valve. A rock shaft 67 is journaled in a bearing 68, on member 44, and has at one end a circular head 69 provided with an angular (flattened) tongue 70. This head 69 is fitted to seat and turn within recesses 71 and 72 formed in the body 44 and inner end of hub 64, and the tongue 70 engages an angular axial opening 73 in said hub, whereby the valve is coupled to the shaft for oscillation therewith while permitted to have sliding motion relative to the face of body 44. A hollow boss 74, formed upon the outer wall of cap 61, slidably receives the hollow stem 75 of a cup-shaped follower 76 receiving and abutting against an annular flange 77 on the outer end of the valve hub 64. A coiled spring 78, enclosed in the boss 74 and bearing on the stem 75, acts to yieldingly hold the valve pressed against its seat, while a similar spring 79, enclosed in the stem 75, bears upon the tongue 70 and acts to hold the head 69 of shaft 67 seated in recess 71. By this means the valve is automatically adjusted by spring pressure to compensate for wear, and held at all times in leak-tight engagement with its seat. The tail piece 66 is provided to balance the valve in its movements and to counteract, by the pressure of the motive fluid against it, any tendency to tilting motion of the disk 65 on its axis whereby leakage would be caused. In the back of this tail piece is formed a cavity or pocket 80, communicating constantly with the valve chamber through a relief opening 81, whereby the formation of a vacuum or a lifting pressure between the tail piece and valve seat face is prevented. A crank arm 107 having a sleeve portion 82, applied to the opposite end of shaft 67 beyond the bearing 68, is provided for transmitting controlling motions to the valve, as hereinafter described.

The valve disk 65 has flattened side portions or wings 83 and 84 and a swelled central or body portion 85, and the lateral edges 83' and 84' of said portions 83 and 84 extend radially to the valve axis on lines conforming substantially to the radial arrangement of the ports 42 and 43 and the outer lateral edge walls 42' and 43' of said ports. The overall lateral area, or superficial lateral dimensions of the valve, is such that when the valve is in normal or closed position, as shown in Figure 15, its lateral flattened portions 83 and 84 will overlap and extend laterally beyond the walls of the ports 42 and 43 and thus completely close said ports to the valve chamber. Each wing portion 83 and 84 of the valve is provided with two pairs of small openings 86 and 87, extending between its outer and seat faces and arranged at different radial distances from the valve axis, said openings 86 and 87 being arranged inwardly of but adjacent to the edges 83' and 84' and respectively in proximity to the inner and outer extremities of such edges. The openings 86 and 87 of each pair cooperatively provide a feed port of a determined feed capacity, and jointly said pairs of openings provide successively working ports of like capacity, adapted for correspondingly increasing the volume of motive fluid supplied to the motor at prescribed stages of a preliminary working movement of the valve. A groove 88, formed in the seat face of each wing of the valve, extends longitudinally between and connects the two pairs of openings 86 and 87, said grooves and openings performing the same function with respect to the valve wings as the relief cavity 80 and opening 81 of the tail piece 66.

By reference to Figure 14 it will be observed that the openings 86 and 87 in each valve wing are arranged in alinement on a line inclined to the radial lines of the lateral edge of the wing and outer edge wall of the underlying port 42 or 43, so that the openings 86, in the closed position of the valve, lie somewhat closer to the port 42 or 43, as the case may be, than the openings 87, as a result of which the openings 86 will register with the port before the openings 87 register therewith on the movement of the valve to adjust either valve wing to open position. It will be evident, also, that both sets of openings 86 and 87 will register with the port before the lateral edge of the particular valve wing employed passes beyond the outer lateral edge of the coacting feed port 42 or 43 and more or less directly opens up said port into direct communication with the valve chamber. The swelled portion 85 of the valve is formed in its rear face with an exhaust cavity 89. This cavity is provided to connect either port 42 or 43 with the port 46 and is of sufficient width to normally connect both ports 42 and 43 with the port 46 when the valve is closed. By this means both feed ports and manifolds will be directly connected with the atmosphere when the valve is closed, allowing any retained fluid pressure to exhaust and preventing any retention of pressure liable to cause creeping of the parts of the mechanism driven by the motor or excessive motion of such mechanism on the subsequent admission of fluid pressure to the motor in the next working action.

The valve is movable in the direction of the arrow shown in Figure 14 for supplying motive fluid through the port 42 and into the manifold 39 for driving the motor in one direction, and is movable in the opposite direction for the purpose of admitting motive fluid through the port 43 and into the manifold 40 for driving the motor in the reverse direction. The ports 42 and 43 and the manifolds 39 and 40 are, accordingly, adapted to interchangeably operate as intake ports and manifolds and exhaust ports and manifolds in different directions of motion of the engine. When the valve is moved in one direction or the other, to cause one or the other of its wings 83 or 84 to uncover the coacting port 42 or 43, said wing simultaneously closes said port against communication with the exhaust port 46, and the other valve wing opens communication between its port and the port 46, so that while the live motive fluid is being supplied to the cylinders through one manifold and coacting ports, the exhaust of spent motive fluid may take place through the other manifold and a coacting set of ports. When, however, as previously described, the valve is returned from any working position to closed position, it opens communication between both manifolds and both ports 42 and 43 and the exhaust port 46, for the purpose of permitting any retained pressure to exhaust to the atmosphere, with the beneficial results heretofore stated.

On its working action in either direction, the valve has a two-stage preliminary movement or traverse, and a variable stage final movement or traverse. On the first stage of its preliminary traverse, in the direction indicated, for example, by the arrow in Figure 14, a short movement of the valve first brings the openings 86 into communication with the port 42, and as its movement or traverse continues to its second stage the openings 87 are then brought into registry with the port 42. The bringing of the small openings 86, of gaged size, into registry with port 42 allows a sufficient amount of the motive fluid to pass to the cylinders to start the engine into motion, without jolts, jars or other irregularities, while the bringing of the ports 87 into registry with the port 42 allows fluid to flow through all four ports 86 and 87, as shown in Figures 17 and 18, with the result of the flow of an augmented supply of motive fluid to the cylinders, such augmented supply being sufficient to drive the motor at a predetermined slow working speed, at which speed it may be allowed to work, if desired, for transmitting a figured slow working motion to the mechanism to be driven. The supply of the motive fluid in regular and progressively increasing quantities, on the two stages of the preliminary movements of the valve, results in a smooth starting of the motor and an even and regular increase in its working speed up to the slow speed point, without undue acceleration of motion at any time. Should it be desired to drive the motor at a higher rate of speed, up to a predetermined maximum limit, a further opening movement of the valve on its second or final variable traverse, will cause the edge portion 83' of the valve wing 83 to pass the edge wall 42' of the port 42, as shown in Figures 19 and 20, thus uncovering said port directly to the valve chamber and permitting air to flow through the passage thus formed as well as through the openings 86 and 87, the increase of fluid pressure giving greater speed to the engine. The range of opening movement of the valve, on its second traverse, in which it establishes direct communication between the port 42 and the valve chamber, may be varied so as to open the port to any degree desired, up to a full opening movement, so that the increase of speed of the engine beyond slow working speed may be governed and regulated as desired to secure any degree of high speed motion up to a designed maximum speed. The variable motion of the valve across the feed opening, on such second traverse, will, it is obvious, also enable a fine and effective graduative action in the supply of the motive fluid to be obtained, so that a variable increase of speed, from slow speed up to maximum high speed, may be secured without irregularities of motion of the working parts. The operation in reversing the engine, by movement of the valve to cause the valve wing 84 to open communication between the valve chamber and port 43 to a greater or less degree will be readily understood from the foregoing description.

The central portion 32 of the valve chambers 5, and unoccupied portions of the gear casing section 3 may, like the crank and cross head chambers 6, serve, in addition to their stated functions, as reservoirs for grease, oil or other lubricant, allowing the parts contained therein to work directly in the lubricant, from which reservoirs the lubricant will be distributed by the motion of the working parts to the other associated working and bearing parts of the engine. By this means, as all the working parts are completely enclosed, all working and bearing surfaces will be thoroughly protected against the admission of dirt, grit and other foreign substances and at the same time thoroughly and efficiently lubricated.

The construction of the motor casing, and mode of assemblage of the working parts, adapts the engine to be readily and conveniently set up for use and taken down, in whole or part, for cleaning, inspection, repairs or replacements with the expenditure of a minimum amount of time and labor. In disassembling the engine, it is only necessary to disconncet the casing section 3 from the casing section 2 by removing the screws or bolts 4, whereupon the casing section 3 may be drawn away from casing section 2, withdrawing with it the transmitting gearing, including the shafts 20, the counterbalances 21 and crank pins 19. By then disposing the motor casing 2 in a convenient position, each piston unit, composed of a pair of pistons 15, rods 16 and cross head yoke 17, may be removed through the open front of its chamber 6, by first detaching the cylinder heads 11 and extracting the cylinders 8 and then moving the piston unit longitudinally in one direction within one of the openings 7 and until the other piston clears its opening 7 and moves into the chamber 6, whereupon, by proper angular movements of the piston unit, as indicated in dotted lines in Figure 10, the piston unit may be withdrawn through the front of the chamber 6, after which the associated valve operating crank element may be extracted from its bearing 55. The associated intake and exhaust valve is thereby left free for withdrawal, and may be withdrawn endwise from the valve chamber upon removal of the heads 33. By a reversal of the operations just described, the parts may be as easily and rapidly assembled. The removal of the casing section 3 from the section 2 and any mechanism to which the section 3 may be applied, will leave the parts therein exposed for cleaning, inspection, repairs, replacement, or disassemblage, as will be readily understood. The construction disclosed, therefore, not only provides a compact type of engine having all the advantages mentioned, but which may be kept in thorough working order with a minimum amount of time, labor and expense.

The shaft 29 is herein shown as a screw shaft, and in Figure 23 I have illustrated one mode of practical use of the invention, in which the shaft 29 is employed for transmitting motion to a locomotive reverse gear. The screw portion of this shaft extends into a cylinder 89, to which the casing section 3 of the motor is fastened by bolts 90, and arranged to travel upon the screw portion of shaft 29 is a nut 91 adapted for transmitting back and forth movements to a plunger 92, operatively disposed within the cylinder 89, and coupled at its outer end to the reach rod 93 of the reverse gear. (Not shown.) The headed end 28 of shaft 29 is journaled in a bearing bushing 94 in the motor casing section 3, the forward thrust of the shaft being received and sustained by a thrust member 95 and thrust washer 96, while the backward thrust of the shaft is received and sustained by a thrust washer 97 abutting against a portion of casing section 3. A sliding sleeve 98 is journaled in a center bearing 99 in the casing section 2 coaxially with the shaft 29 and is formed with internal screw threads 100 engaging a screw surface 101 formed on a controlling rod or shaft 102. The forward end or head portion 103, of the sleeve 98, is slotted to engage with a tongue 104 on the head portion 28 of shaft 29, thus coupling said shaft and sleeve for rotation in unison, while permitting independent sliding movement of said sleeve. A supporting bracket 105, bolted to the casing section 2 of the motor, forms an outboard bearing for the screw shaft 102, and a key 106, inserted in this bearing, prevents rotary movement of the screw shaft 102. The crank arm 107 on the rock shaft 67, of the throttle valve, is coupled by a pin connection 108 with a forked arm 109 on the sleeve 98, said pin engaging a bearing sleeve 108ª slidable vertically in the slot 109ª of said forked arm (see Figs. 4 and 10ª), and said arm 109 having a sleeve portion 110 secured to the sleeve 98 by nuts 111 and keyed against rotation to the bracket 105, as at 101ª, whereby, through sliding movements of the sleeve 98, the throttle valve member will be actuated, the vertical movement of the bearing sleeve 108ª in slot 109ª allowing the arm 107 to move in an arc without a restrictive binding action. The rod or shaft 102 is coupled to the reverse lever 112, mounted in the locomotive cab, and which is movable along the quadrant 113. In the operation of this organization, when the reverse lever 112 is moved along the quadrant to a different position, the rod 102 is operated to impart a longitudinal movement to the screw shaft 102, with its threaded sleeve 98, which in turn actuates the valve rocker shaft 67 through the arm 82, and operates the throttle valve to start the motor. As the motor then starts running, it rotates the reverse gear in the desired direction. This rotary movement of the screw 29 also operates, through the tongue connection 104, to rotate the sleeve 98, relatively to the screw shaft 102, whereby a longitudinal movement is imparted to the sleeve 98, since the shaft 102 is held from rotary movement. This longitudinal movement of the sleeve 98, operates, through its connections with the throttle valve, to close said valve and stop the motor. In this manner, the reverse gear screw operates the sleeve 98 in the opposite direction to that in which it is previously actuated by the manual movement of the reverse lever 112, thus ensuring automatic control for any position of the reverse lever. The degree of movement of the throttle valve, for starting the motor and driving it at slow or fast speed is, obviously, dependent upon the degree of movement of the throttle lever 112, either forwardly or backwardly from its neutral position, and it will be apparent that the reverse gear shifting member 92 may be moved forwardly or rearwardly to different degrees by proper forward or backward movements of lever 112, so as to shift the reverse gear accordingly. When the lever 112 is moved rearwardly, the throttle valve is operated in the reverse direction to that specifically hereinbefore described, to make the port 43 the intake port instead of port 42, whereby reverse motion of the motor and of the locomotive reverse gear is accomplished. The smoothness of action of the motor, and its capability of operating evenly at slow or high speeds, ensures adjustment of the locomotive reverse gear, without objectionable irregularities of motion, in either direction as fast or as slow as desired. It will be observed that thrust washer 95, in addition to its stated function, also serves as a partition closing the outer end of section 3 of the casing against the escape of lubricant, allowing the casing to be filled with lubricant in which the gears may work to keep them constantly lubricated.

The course of flow of the air in driving the motor in one direction in order, for example, to shift the plunger 92 rearwardly, is as follows: On a rearward movement of lever 112, as shown in Figure 23, sleeve 98 will be shifted by and with rod 102 in a forward direction, which movement is permitted by the slotted head and tongue connection 103—104, and the valve 63 will be moved downwardly to more or less uncover port 42 to the valve chamber and to more fully open port 43 to the exhaust outlet 46. Live fluid pressure will then flow from the throttle valve casing through port 42 into manifold chamber 39 and thence into the cylinders through the ports 36 and 35, whereby the pistons will be actuated to drive shaft 29 so as to shift plunger 21 in the given direction. Exhaust of spent fluid on this operation will take place via ports 35 and 37, manifold 40, port 43, valve cavity 89 and passage 46. The operation, as above described, will effect a reverse action of a locomotive reverse gear, when the invention, as shown in Figure 23, is employed as a reverse gear operating motor. When, on the other hand, lever 112 is moved forwardly, sleeve 98 and rod 102 will be moved as a unit rearwardly and valve 63 will be moved upwardly so as to uncover port 43 more or less to the valve casing and to more fully open port 42 to the exhaust outlet 46. Live fluid pressure will then flow through port 43 into manifold chamber 40 and thence through ports 37 and 35 to the cylinders for actuating the pistons, while exhaust of the spent motive fluid will take place through ports 35 and 36, manifold 39, port 42 and cavity 89 and through exhaust outlet 46 to the atmosphere. In this operation the locomotive reverse gear will be adjusted for forward running motion of the engine. The sleeve 98 and rod 102, having the threaded connection 100—101, may be in accordance with similar elements shown in Stevens Patent No. 1,431,992, dated October 17, 1922, and operate in the same manner, through said threaded connection, to effect the return of the throttle valve after operating adjustment, to neutral position so as to stop the operation of the motor after shaft 29 has made a prescribed number of revolutions, as fully set forth in said Stevens patent, or any other suitable construction of means for the same purpose may be employed when desired.

Having thus fully described my invention, I claim:—

1. In a motor, a housing, a driven shaft disposed axially of the housing, cylinders and pistons disposed in working pairs on opposite sides of said shaft, the cylinders of each pair communicating with a crank chamber therebetween, transmission shafts on opposite sides of and in gear with the driven shaft and in alinement with the crank chambers and extending thereinto, connections in the crank chambers between the pairs of pistons and the transmission shafts for transmitting the rectilinear motion of the former into curvilinear motion of the latter, duplex valve devices, one for each pair of cylinders, controlling the supply of fluid pressure to and its exhaust from the respective pairs of cylinders, a throttle valve device controlling the supply of fluid pressure to and exhaust from said duplex valve devices, a slidable, non-rotatable rod coupled to the throttle valve, and a sleeve slidable with the rod and rotatable with the driven shaft, said sleeve being operatively coupled to the rod in the rotation of the shaft for controlling said throttle valve to cut off the supply of fluid pressure to the motor upon a predetermined number of revolutions of said shaft.

2. In a motor, a casing comprising two sections separable on a transverse line, sets of opposed cylinders and pistons carried by one of said casing sections, valve mechanism including a throttle valve also carried by said section, a throttle valve controlling device carried by the same section, a driven shaft on the other casing section, and transmission shafts, one for each set of pistons, on the same casing section as the driven shaft and in gear with said driven shaft, said driven shaft and transmission shafts having portions projecting beyond the casing section on which they are mounted and operatively coupled by interfitting connections respectively to the said throttle valve controlling device and coacting sets of pistons so as to be uncoupled upon the detachment and endwise withdrawal of one casing section from the other, said driven shaft governing the throttle valve controlling device to effect the closure of said valve from a predetermined open position and stoppage of the motor upon a predetermined number of revolutions of said driven shaft following a motor starting action.

3. In a motor, the combination of a rotary driven shaft, cylinders and pistons arranged in longitudinally alined pairs on opposite sides of the shaft, said pistons having reciprocatory motion in planes parallel with each other and at right angles to the shaft, means for transmitting the reciprocating motions of the pistons into rotary motion applied to the shaft, a throttle valve governing the supply of fluid pressure to and its exhaust from the cylinders, a longitudinally movable sleeve, an operating connection between said sleeve and the valve, a controlling rod having a threaded engagement with the sleeve, and a coupling connection between the sleeve and driven shaft adapting said sleeve to slide independently of the shaft but to rotate therewith.

4. In a motor, the combination of a casing having cylinders and coacting intake and exhaust passages, pistons working in said cylinders, a valve casing having intake and exhaust ports communicating with said intake and exhaust passages, a rotary segmental valve having opposite edge portions controlling said ports, the lateral edge walls of the intake ports and lateral edge portions of the valve being arranged radially to the axis of the valve, and said valve being provided adjacent to each lateral edge portion with a pair of small ports at different radial distances from its axis, said small ports being arranged in alinement with each other on a radial line inclined to the radial line of the said lateral edge portion of the valve.

5. In a motor, a housing comprising two transversely divided detachably coupled sections having abutment faces, one of said sections being provided with two pairs of parallel cylinders and crank chambers between the cylinders of each pair, said chambers opening through the abutment face of said section and being closed by the abutment face of the other section when said sections are assembled, pistons in said cylinders, the pistons of each pair of cylinders being rigidly coupled to a cross-head guide movable in the intervening crank chamber and having a cross-head block movable therein, a driven shaft journaled axially in the second-named housing section on a line between the pairs of cylinders, and transmission shafts in gear with the driven shaft and journaled in the second-named casing section on opposite sides of said driven shaft, said transmission shafts being arranged in alinement with the crank chambers of the first-named housing section and having end portions extending beyond the abutment face of the second-named housing section and into said crank chambers and provided with wrist-pins engaging said cross-head blocks.

6. In a motor, a housing comprising two transversely divided detachably coupled sections having abutment faces, one of said sections being provided with two pairs of parallel cylinders and crank chambers between the cylinders of each pair, said chambers opening through the abutment face of said section and being closed by the abutment face of the other section when said sections are assembled, pistons in said cylinders, the pistons of each pair of cylinders being rigidly coupled to a cross-head guide movable in the intervening crank chamber and having a cross-head block movable therein, a driven shaft journaled axially in the second-named housing section on a line between the pairs of cylinders, said shaft having at its inner end a projecting tongue, a sleeve journaled axially in the first-named housing section and provided with a slotted head portion slidably receiving said tongue, and transmission shafts in gear with the driven shaft and journaled in the second-named casing section on opposite sides of said driven shaft, said transmission shafts being arranged in alinement with the crank chambers of the first-named housing section and having end portions extending beyond the abutment face of the second-named housing section and into said crank chambers and provided with wrist-pins engaging said cross-head blocks.

7. In a motor, the combination of a rotary driven shaft, cylinders and pistons arranged in longitudinally alined pairs on opposite sides of the shaft, said pistons having reciprocatory motion in planes parallel with each other and at right angles to the shaft, a transmission shaft driven by each pair of pistons, said transmission shafts being disposed on opposite sides of and parallel with the driven shaft and in gear therewith, a throttle valve governing the supply of fluid pressure to and its exhaust from the cylinders, a longitudinally movable sleeve, an operating connection between said sleeve and the valve, a controlling rod having a threaded engagement with the sleeve, and a coupling connection between the sleeve and driven shaft adapting said sleeve to slide independently of the shaft but to rotate therewith.

8. In a motor, a housing, a driven shaft disposed axially of the housing, cylinders and pistons carried by the housing and arranged in longitudinally alined pairs on opposite sides of the shaft, said pistons having reciprocatory motion in planes parallel with each other and at right angles to the shaft, means for transmitting the reciprocating motions of the pistons into rotary motion applied to the shaft, a throttle valve governing the supply of fluid pressure to and its exhaust from the cylinders, a longitudinally movable and rotary sleeve disposed coaxially in said housing and with said driven shaft, an operating connection between said sleeve and the valve, a controlling rod extending into the sleeve and having a threaded engagement therewith, and a coupling connection between one end of said shaft and one end of said sleeve adapting said sleeve to slide independently of the shaft but to rotate therewith.

9. In a motor, the combination of a driven shaft, reciprocating pistons working in parallel planes with each other and with the shaft on opposite sides of the shaft and at right angles to the line of said shaft, gearing between the pistons and shaft for translating the rectilinear motion of the pistons into rotary motion of the shaft, valve devices coupled to the pistons and directly operated thereby for supplying fluid pressure for driving the pistons so as to transmit either clockwise or counter-clockwise rotation to the shaft, an oscillatory throttle valve movable at right angles to the line of the driven shaft and governing the supply of fluid pressure to said valve devices, a longitudinally sliding, non-rotatable member arranged in axial alinement with the driven shaft and coupled to the throttle valve and operative to adjust said valve to open position, and connecting means between the driven shaft and said longitudinally slidable, non-rotatable member for operating the latter to close the throttle valve and stop the motor upon a predetermined number of revolutions of said shaft.

10. In a motor, a housing comprising two transversely divided detachably coupled sections having abutment faces, one of said sections being provided with cylinders and a crank chamber between the cylinders, said chamber opening through the abutment face of said section and being closed by the abutment face of the other section when said sections are assembled, pistons in said cylinders rigidly coupled to a cross-head guide movable in the intervening crank chamber and having a cross-head block movable therein, a driven shaft journaled in the second-named housing section, said shaft having at its inner end a projecting tongue, a sleeve journaled in the first-named housing section and provided with a slotted head portion slidably receiving said tongue, and a transmission shaft in gear with the driven shaft and journaled in the second-named casing section parallel with said driven shaft, said transmission shaft being arranged in alinement with the crank chamber of the first-named housing section and having an end portion extending beyond the abutment face of the second-named housing section and into said crank chamber and provided with a wrist-pin engaging said cross-head block.

11. In a motor, a housing, a driving shaft arranged axially of the housing, transmission shafts parallel with and on opposite sides of the driven shaft and in gear therewith, cylinders, pistons operating in said cylinders in planes at right angles to the shafts, connecting means between the pistons and the transmission shafts for translating the rectilinear motion of the former into rotary motion of the latter, a valve mechanism, including an oscillatory throttle valve member, for controlling the flow of fluid-pressure to and from said cylinders, a rotatable reciprocatory sleeve in axial alinement with and coupled to the driven shaft, a slidable non-rotatable rod having a threaded engagement with the sleeve, and an operating connection between said sleeve and the oscillatory throttle valve uninfluenced by the rotary motion of the sleeve but influenced by the reciprocatory movements thereof for operating said valve.

12. In a reversible motor, the combination of a piston casing containing two pairs of working cylinders, two distribution valve chambers, one for each pair of cylinders, two independent manifolds, two sets of passages communicating with each valve chamber, each set comprising three passages, one communicating with a working cylinder, one communicating with one of the manifolds, and one communicating with the other manifold; two independent passages, each leading from a throttle valve device to one of the manifolds; a piston in each of the cylinders; two piston rods, each coupling the pistons of each pair of cylinders, each rod having a cross head guide intermediate its length; a cross head for each guide; a driving shaft operated by each cross head; a transmission shaft; gears coupling the driving shafts to the transmission shaft; a distribution valve in each valve chamber, comprising a stem, and three spaced discs at each end of the stem, so disposed that movement of the valve in one direction will establish communication between the passage to one cylinder of a pair, and one of the manifolds, and, simultaneously establish communication between the passage to the other cylinder of the pair and the other manifold, and movement of the valve in the opposite direction will effect a reversal of said communications; means, driven by the cross head, for effecting the aforesaid movements of the distribution valves; and a throttle valve device, comprising an intermediate port only for the discharge of motive fluid; and two side ports, each communicating with one of the passages to the manifold, and adapted to alternately serve for the induction and eduction of the motive fluid; and a valve, movable from an intermediate position to forward and reverse positions, and adapted, when in intermediate position, to close the two side ports; when in forward position, to open one of the side ports for the admission of motive fluid to a manifold, and close the other side port against the admission of motive fluid, but to establish communication between it and the intermediate port for the exhaust of motive fluid from the other manifold; and, when in reverse position, effecting a reversal of the communications established in first position.

13. In a reversible motor, the combination of a piston casing containing two pairs of working cylinders, two distribution valve chambers, one for each pair of cylinders, two independent manifolds, two sets of passages communicating with each valve chamber, each set comprising three passages, one communicating with a working cylinder, one communicating with one of the manifolds, and one communicating with the other manifold; two independent passages, each leading from a throttle valve device to one of the manifolds; a piston in each of the cylinders; two piston rods, each coupling the pistons of each pair of cylinders, each rod having a cross head guide intermediate its length; a cross head for each guide; a driving shaft operated by each cross head; a transmission shaft; gears coupling the driving shafts to the transmission shaft; a distribution valve in each valve chamber, comprising a stem, and three spaced discs at each end of the stem, so disposed that movement of the valve in one direction will establish communication between the passage to one cylinder of a pair, and one of the manifolds, and simultaneously establish communication between the passage to the other cylinder of the pair and the other manifold, and movement of the valve in the opposite direction will effect a reversal of said communications; means, driven by the cross head, for effecting the aforesaid movements of the distribution valves; a throttle valve device, comprising an intermediate port only for the discharge of motive fluid; and two side ports, each communicating with one of the passages to the manifold, and adapted to alternately serve for the induction and eduction of the motive fluid; and a valve, movable from an intermediate position to forward and reverse positions, and adapted, when in intermediate position, to close the two side ports; when in forward position, to open one of the side ports for the admission of motive fluid to a manifold, and close the other side port against the admission of motive fluid, but to establish communication between it and the intermediate port for the exhaust of motive fluid from the other manifold; and, when in reverse position, effecting a reversal of the communications established in first position; a rotatable reciprocatory sleeve in axial alignment with, and coupled to, the driven shaft; a slidable, non-rotatable rod having threaded engagement with the sleeve; an operating connection between the sleeve and the throttle valve uninfluenced by the rotary motion of the sleeve, but influenced by the reciprocatory movements thereof, for operating the valve; and a reverse lever connected to the slidable rod.

In testimony whereof I affix my signature.

NORMAN EDLOW WOODS.